United States Patent [19]

Lavallee

[11] 4,147,823

[45] Apr. 3, 1979

[54] LAMP GLASS ENVELOPE CONTAINING MARKING THEREON

[75] Inventor: Francois A. Lavallee, Cleveland Heights, Ohio

[73] Assignee: General Electric Company, Schenectady, N.Y.

[21] Appl. No.: 807,581

[22] Filed: Jun. 17, 1977

Related U.S. Application Data

[63] Continuation-in-part of Ser. No. 555,832, Mar. 6, 1975, abandoned, and a continuation-in-part of Ser. No. 354,676, Apr. 26, 1973, abandoned.

[51] Int. Cl.[2] .......................... B65D 1/00; B05D 5/12; C03C 17/26; H01K 1/32

[52] U.S. Cl. .......................................... 428/35; 106/20; 106/286.5; 156/654; 427/106

[58] Field of Search ........................ 106/19, 20, 55, 69, 106/286, 82, 85, 89; 148/6.15; 423/111, 115, 305; 427/215, 266, 269, 287, 106, 64, 66, 67, 107; 156/654, 653

[56] References Cited

U.S. PATENT DOCUMENTS

| | | | |
|---|---|---|---|
| 2,843,504 | 7/1958 | van Bakel et al. | 427/106 |
| 2,909,451 | 10/1959 | Lawler et al. | 106/286 X |
| 3,023,337 | 2/1962 | Repsher | 427/106 X |
| 3,031,418 | 4/1962 | Bugosh | 106/286 X |
| 3,035,318 | 5/1962 | Campbell | 106/286 X |
| 3,080,243 | 3/1963 | Vodicka | 106/286 X |
| 3,082,133 | 3/1963 | Hofmann et al. | 106/286 X |
| 3,112,265 | 11/1963 | Yuille | 106/286 X |
| 3,650,783 | 3/1972 | Yates | 106/69 |
| 3,785,845 | 1/1974 | Birchall et al. | 427/202 |
| 3,804,648 | 4/1974 | Birchall et al. | 106/85 X |
| 3,982,046 | 9/1976 | Mason et al. | 427/106 |
| 3,984,590 | 10/1976 | Mason et al. | 427/106 |
| 4,005,232 | 1/1977 | Colebourne et al. | 427/106 X |
| 4,081,709 | 3/1978 | Collins et al. | 427/106 X |

*Primary Examiner*—Joan E. Welcome
*Attorney, Agent, or Firm*—John F. McDevitt; Lawrence R. Kempton; Frank L. Neuhauser

[57] ABSTRACT

A marking ink for glass and ceramic substrates is disclosed which can be deposited from a liquid dispersion and heat-cured rapidly to provide an insoluble adherent film. The adhesive binder for the marking ink is an inorganic cement produced by heat-reaction between phosphoric acid and an aluminum salt of a weak organic acid to form an insoluble vitreous matrix in the final product. Various liquid dispersions for said marking ink are disclosed which are particularly suitable for application as indicia means upon the glass envelope of an electric lamp and can be applied during conventional lamp manufacture.

1 Claim, No Drawings

LAMP GLASS ENVELOPE CONTAINING MARKING THEREON

This application is a continuation-in-part of my application Ser. No. 354,676, filed Apr. 26, 1973, and now abandoned, as well as application Ser. No. 555,832, filed Mar. 6, 1975, and now abandoned both assigned to the assignee of the present application.

BACKGROUND OF THE INVENTION

A great variety of marking inks are known and an ink for permanent marking will generally contain a color pigment, a filler, and some form of adhesive binder. In product applications involving high temperature exposure as occurs during operation of many electric lamps, it is also known to employ various inorganic binders generally in the form of low melting glasses or glass oxides. Inorganic phosphate binders have also been employed previously in connection with electric lamp manufacture for various purposes and a basing cement having an $ALPO_4$ binder is disclosed in U.S. Pat. No. 3,080,243, issued Mar. 5, 1963, to Vodicka and assigned to the assignee of the present invention.

More recently, it was discovered that $Al_2O_3$ could be reacted with phosphoric acid to provide the binder in a marking ink when placed upon the outside surface of the glass envelope of an incandescent lamp during high speed manufacture of the lamp. More particularly, a liquid dispersion of the marking ink containing color pigment and filler along with the aforementioned binder system was applied to form the $ALPO_4$ binder in situ with residual heating from the heated glass substrate and provide an adherent coating for the manufacturers monogram. Various problems were encountered with these marking inks, both during application of the liquid dispersion and with performance of the heat-cured film. The liquid dispersions were found to be unstable during machine handling and prone to either excessive thickening until becoming unusable, or becoming too fluid through excessive moisture pickup. The heat-cured films were also prone to being easily abraded and moisture sensitive.

With increasing speeds at which electric lamps are now being manufactured, it becomes desirable to find a marking ink which can be applied more reliably and provides a more permanent indicia means for the lamp. It is not readily possible to substitute other vitreous binder systems in the marking ink in order to improve moisture and abrasion resistance because the known materials require higher temperatures and longer curing periods than are available. Variations in thickness of the glass envelopes employed for lamp manufacture can further modify the conditions of forming a permanent and moisture proof film so that it becomes necessary to find a suitable binder which can be cured at as low a temperature, and in as short a time period as possible.

SUMMARY OF THE INVENTION

It has now been discovered, surprisingly, that a more general purpose marking ink for glass and ceramic substrates can be formulated by reacting an aluminum salt of a weak organic acid with phosphoric acid to provide a matrix of insoluble $ALPO_4$ cement which adhesively bonds the filler and color pigment components of the marking ink together and further achieves an adherent vitreous bond to the substrate. While the bonding mechanism of the present heat-cured marking ink is not fully understood, it has been observed that the bond with the substrate yields the appearance of an etching action. The utilization of the present binder system also permits liquid dispersions to be prepared that are less corrosive to handling equipment than were previously known, and there are no corrosive by-products formed during the heat-cure. Said in another way, less of the phosphoric acid component is used than was previously employed, and there will be no appreciable offsetting effect from the acid radical of the aluminum salts presently being used. By "phosphoric acid" component in connection with the present invention is meant either ortho-phosphoric acid or a mixture of orthophosphoric acid with meta-phosphoric acid which both react at relatively low temperatures with the alumium salt to form a heat-cured product having a vitreous $ALPO_4$ matrix phase for permanent adherence to the glass or ceramic substrate.

DESCRIPTION OF THE PREFERRED EMBODIMENTS

In its preferred embodiments, particular aqueous dispersions of the essential components for the marking ink are prepared having superior heat-curing characteristics along with chemical stability and a useful degree of thixotropy. The preferred liquid dispersions are formulated to provide a coating composition which is sufficiently stable during the machine handling which takes place in the high speed production of incandescent lamps and which can be heat-cured on the lamp manufacturing equipment at lower tempratures and shorter time periods than previously experienced. Proper machine handling ability of these dispersions at such high speeds requires control of both thixotropy and viscosity with certain components being included in the dispersions for this purpose. The liquid phase in these dispersions comprise an aqueous solution of the essential aluminum salt and phosphoric acid components along with ethylene glycol and glycerine which help provide thixotropy and viscosity control, respectively. The disperse phase of said dispersions is made up of an inorganic filler providing additional thixotropic behavior along with one or more color pigments which can also influence the rheological characteristics of the final dispersion. For example, a black marking ink may contain a black oxide pigment along with carbon black in sufficient amounts to provide the desired coloration in the heat-cured film. The carbon black has been found to provide rheological action which helps when the dispersion is being applied by preventing or minimizing skid of the rollers in the application equipment. As will be more apparent from the specific examples given hereinafter for the preferred aqueous dispersions, the useful range of the essential aluminum salt and phosphoric acid components in the marking ink can be varied in accordance with certain general principles. The weight percent of the aluminum salt component in said dispersions can be varied from about 5–15% of the total weight depending upon the physical characteristics and amounts of the particular pigments being employed for color appearance in the heatcured product. A significant excess in weight percent of the phosphoric acid component is employed beyond that needed for chemical conversion of the aluminum salt to the $ALPO_4$ binder with the maximum amount of this component in the heat-cured product being dictated by the general hygrosopic nature of phosphoric acid. More particularly, while excess meta-phosphoric acid and/or orthophosphoric acid is desirable in the preferred formulations to achieve faster and lower temperature curing of the marking ink product, it has also been found that a weight ratio of this component with respect to the aluminum salt component in a liquid dispersion beyond about 2.5 to 1 can result in a heat-cured film which is partially water-soluble, hence, not adequately permanent for commercial lamp applications.

Accordingly, preferred liquid dispersions, according to the present invention, are illustrated in the examples below. Useful aluminum salt and phosphoric acid components are commercially available and can be used within the guidelines above provided. The aluminum salts of weak organic acids which can be used include aluminum stearate in the mono, di and tri stearate forms; aluminum tri palmitate; aluminum tri octoate; aluminum tri hydroxy stearate; aluminum acetylacetonate; and others including 2–4 pentanedione; 2–4 hexanedione; 2–4 heptanedione; and 2–4 octanedione. Suitable weak organic acids contain at least five carbon atoms since aluminum salts of lower carbon containing acids such as acetic acid, fumaric acid, formic acid or propionic acid would enhance the corrosive effect of the marking ink upon the lamp manufacturing equipment. A commercial grade of the meta-phosphoric acid which can be employed in the present marking ink is that containing up to 35% by weight of $NaPO_3$. The useful fillers are generally inorganic oxides in a particulate form which can be suspended in the liquid dispersions to provide thixotropy and other rheological behavior thereto such as body and the like. For example, a silica powder having an average particle size in the range 325 mesh provides a useful rheological agent in the liquid dispersion which aids in transferring the coating composition during machine handling. A finer size grade of silica can also be included to further provide abrasion resistance in the heat-cured film for greater permanency. In the following examples of typical liquid formulations, the compositions are given in percentages by weight.

EXAMPLE I

A black marking ink can be prepared with the following composition:

| Component | Weight Percent (%) |
|---|---|
| Glycerine | 6.8 |
| Ethylene Glycol | 12.1 |
| Ortho-Phosphoric Acid | 25.3 |
| Deionized Water | 7.2 |
| Meta-Phosphoric Acid | 12.1 |
| Aluminum Acetylacetonate | 10.1 |
| Silica | 3.2 |
| Carbon Black | 1.5 |
| Black Pigment (Copper/ Chromium Oxide) | 21.7 |

The above composition was prepared by mixing the glycerine, ethylene glycol, ortho-phosphoric acid, and deionized water components in a glass jar. The mixture was stirred at room temperature with an air mixer having a stainless steel impeller and the meta-phosphoric acid component was added with continuous stirring until this acid component had been completely dissolved. With continued stirring, the aluminum acetylacetonate component was added to the mixture over 2–3 hours. The final silica, carbon black, and black pigment components were then suspended in the solution with continued stirring for an additional 2–3 hours to produce the final stable dispersion.

The above prepared dispersion was applied by conventional means to provide a marking ink upon incandescent lamps being manufactured upon high-speed automatic lamp manufacturing equipment. After the liquid dispersion was picked up with rollers, it was then transferred to a stamp or platen for deposition upon the outside surface of the lamp envelopes. The applied liquid dispersion was then heated on said glass envelopes to temperatures up to approximately 300° C for six (6) seconds whereupon a heat-cured product was obtained having the filler and color pigments adhesively bonded together and to the glass substrate surface with an insoluble vitreous $ALPO_4$ cement.

EXAMPLE II

A red marking ink was prepared in approximately the same manner having the following composition:

| Component | Weight Percent (%) |
|---|---|
| Glycerine | 3.5 |
| Ethylene Glycol | 7.7 |
| Ortho-Phosphoric Acid | 14.0 |
| Water | 5.1 |
| Meta-Phosphoric Acid | 6.4 |
| Aluminum Acetylacetonate | 5.5 |
| Silica | 1.7 |
| Red Pigment (Cadmium Sulfur-Selenide) | 56.1 |

It will be noted from the above formulation that a substantial decrease took place in the binder components compared with the relative ratios employed in the preceding example. As a further comparison between said formulations, it can be further noted that relatively more red pigment was employed in the present formulation to provide a desired color appearance in the final heat-cured product.

It will be apparent to those skilled in the art from the foregoing description that a general purpose marking ink has been disclosed having a novel adhesive binder system. It will also be appreciated that various changes can be made in the composition of the marking ink without departing from the spirit and scope of the present invention. For example, still other additives such as thinners, thickeners, solubilizers, and tinting agents can be incorporated in the liquid dispersions to provide comparable results. It is therefore intended to limit the present invention only by the scope of the following claims.

What I claim as new and desire to secure by Letters Patent of the United States is:

1. An electrical lamp having a lamp glass envelope upon which a marking ink has been adhesively bonded to the glass envelope so that the underlying glass substrate has been etched, said marking ink being the heat cured product of a mixture of an aluminum salt of a weak organic acid containing at least five carbon atoms with a phosphoric acid selected from the group of ortho-phosphoric acid and mixtures of orthophosphoric acid with meta-phosphoric acid wherein the weight ratio of phosphoric acid is maintained from a weight ratio for conversion of the aluminum salt to $AlPO_4$ up to an excess weight ratio of about 2.5 to 1 and which mixture further contains an inorganic filler and inorganic color pigment wherein said inorganic filler and inorganic color pigment are bonded together and to the glass substrate with an insoluble vitreous $AlPO_4$ cement, said heat cured product having been obtained by depositing a liquid dispersion of the aluminum salt, phosphoric acid, inorganic filler and color pigment constituents upon the glass substrate and heating said liquid dispersion to a temperature of approximately 300° C. for a sufficient time period to form said heat reaction product.

* * * * *